US007465490B2

(12) United States Patent
Von Blücher

(10) Patent No.: US 7,465,490 B2
(45) **Date of Patent: *Dec. 16, 2008**

(54) PROTECTIVE CLOTHING PROVIDING NBC PROTECTION

(75) Inventor: Hasso Von Blücher, Erkrath (DE)

(73) Assignee: Blucher GmbH, Erkrath (DE)

( * ) Notice: Subject to any disclaimer, the term of this patent is extended or adjusted under 35 U.S.C. 154(b) by 44 days.

This patent is subject to a terminal disclaimer.

(21) Appl. No.: 10/576,779

(22) PCT Filed: Apr. 16, 2004

(86) PCT No.: PCT/EP2004/004029

§ 371 (c)(1), (2), (4) Date: Apr. 21, 2006

(87) PCT Pub. No.: WO2005/049147

PCT Pub. Date: Jun. 2, 2005

(65) Prior Publication Data

US 2007/0059504 A1 Mar. 15, 2007

(30) Foreign Application Priority Data

Oct. 22, 2003 (DE) ................................ 103 49 546
Nov. 22, 2003 (DE) ................................ 103 54 623

(51) Int. Cl.
*B32B 3/26* (2006.01)
*B32B 27/14* (2006.01)

(52) U.S. Cl. .............. 428/316.6; 428/319.3; 428/319.7; 428/198; 96/135; 96/136; 96/154; 442/122

(58) Field of Classification Search .............. 428/316.6, 428/319.3, 319.7, 543, 198; 96/135, 136, 96/154; 442/122
See application file for complete search history.

(56) References Cited

U.S. PATENT DOCUMENTS 4,510,193 A * 4/1985 Blucher et al. .............. 428/196

(Continued)

FOREIGN PATENT DOCUMENTS

DE 39 17 336 11/1990

(Continued)

OTHER PUBLICATIONS

Translation of DE 39 39 373, Blucher et al, Jun. 6, 1991, 2 pages.*

(Continued)

*Primary Examiner*—Hai Vo
(74) *Attorney, Agent, or Firm*—Woodard, Emhart, Moriarty, McNett & Henry LLP

(57) ABSTRACT

The invention relates to an adsorbing material (1) with a protective function against chemical toxins, especially chemical warfare agents, the adsorbing material (1) comprising a multilayered layer construction (2), the layer construction (2) comprising at least one in particular sheetlike carrier layer (3) and, associated to the carrier layer (3), a barrier layer (4) which prevents or at least retards the passage of chemical poisons, the barrier layer (4) comprising on the one hand at least one adsorbing layer (5) based on an adsorbent for chemical poisons and especially on activated carbon, and, on the other hand, at least one at least essentially water and air impervious but water vapor pervious membrane (6) which retards the passage of chemical poisons or is at least essentially impervious to chemical poisons. The adsorbing material (1) has a high wear comfort, in particular good breathability, while at the same time having excellent protection against chemical poisons.

13 Claims, 1 Drawing Sheet

U.S. PATENT DOCUMENTS

| | | | | |
|---|---|---|---|---|
| 4,860,382 | A | 8/1989 | Markwell | 2/82 |
| 5,024,594 | A | 6/1991 | Athayde et al. | 428/246 |
| 5,190,806 | A | 3/1993 | Nomi | 428/198 |
| 5,273,814 | A | 12/1993 | Kelly | 428/244 |
| 5,391,426 | A | 2/1995 | Wu | 428/246 |
| 7,160,369 | B2 * | 1/2007 | von Blucher et al. | 96/132 |
| 7,354,475 | B2 * | 4/2008 | Von Blucher | 96/134 |
| 2005/0076418 | A1 * | 4/2005 | von Blucher | 2/161.6 |
| 2005/0076541 | A1 * | 4/2005 | von Blucher | 36/113 |
| 2007/0240576 | A1 * | 10/2007 | von Blucher et al. | 96/154 |
| 2007/0275619 | A1 * | 11/2007 | von Blucher et al. | 442/80 |

FOREIGN PATENT DOCUMENTS

| | | | |
|---|---|---|---|
| DE | 39 24 033 | A1 | 2/1991 |
| DE | 39 39 373 | | 6/1991 |
| DE | 3939373 | A1 | 6/1991 |
| DE | 40 03 765 | A1 | 8/1991 |
| DE | 43 10 110 | | 1/1994 |
| DE | 195 19 869 | | 12/1996 |
| DE | 103 47 673 | | 6/2005 |
| EP | 0525409 | A2 | 2/1993 |
| WO | WO 95/33007 | | 12/1995 |

OTHER PUBLICATIONS

Translation of DE 40 03 765, Ruiter et al, Aug. 14, 1991, 2 pages.*

McCullough, et al., “A comparison of standard methods for measuring water vapour permeability of fabrics”, Meas. Sci. Technol. 14 (2003), pp. 1402-1408.

European standard DIN EN 31 092, (Feb. 1994), 9 pgs.

* cited by examiner

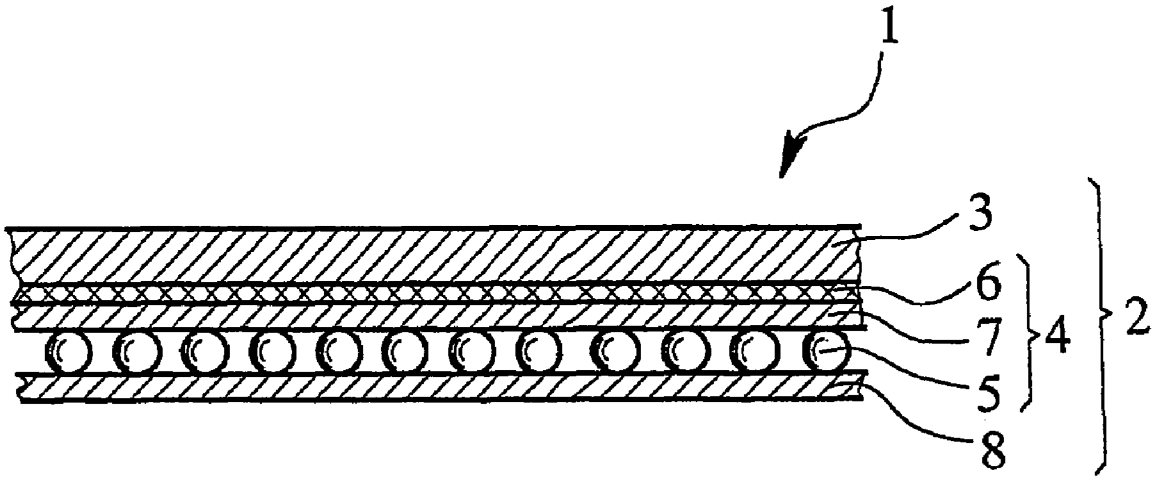
1
3
6
7
4
2
5
8

PROTECTIVE CLOTHING PROVIDING NBC PROTECTION

CROSS-REFERENCES TO RELATED APPLICATIONS

This application is a National Stage filing of International Application PCT/EP2004/004029, filed Apr. 16, 2004, claiming priority to German Application No. DE 103 49 546.0, filed Oct. 22, 2003, and German Application No. DE 103 54 623.5, filed Nov. 22, 2003. The subject application claims priority to PCT/EP2004/004029 and to German Application Nos. DE 103 49 546.0 and DE 103 43 623.4 and these references are expressly incorporated by reference herein, in their entirety.

BACKGROUND OF THE INVENTION

The present invention relates to a breathable adsorbing material having a protective function against chemical poisons, especially chemical warfare agents, having improved wear comfort, especially for the production of protective materials, such as protective suits, protective gloves, protective shoes, protective covers (to transport casualties, for example) and the like, especially for NBC deployment, and also to its use in the aforementioned protective materials.

There are a whole series of chemical entities which are absorbed by the skin and lead to serious physical harm. Examples include the vesicatory mustard gas Yellow Cross and the nerve gas sarin. People likely to come into contact with such poisons must wear a suitable protective suit or be protected against these poisons by suitable protective materials.

There are in principle three types of protective suits: air and water vapor impervious protective suits which are equipped with a layer of rubber impervious to chemical poisons, and which very rapidly lead to a buildup of heat; air and water vapor pervious protective suits, which offer the highest wear comfort; and finally protective suits which are equipped with a membrane which is pervious to water vapor but not to the poisons mentioned.

NBC protective apparel is thus traditionally produced either from completely impermeable systems (suits composed of butyl rubber, for example) or permeable, adsorptive filter systems based on activated carbon (powders, fibers or spherocarbon).

Protective suits against chemical warfare agents that are intended for prolonged deployment under a variety of conditions must not lead to heat buildup for the wearer. Therefore, mainly air pervious materials are utilized.

The air pervious, permeable protective suits generally possess an adsorption layer based on activated carbon which binds the chemical poisons very durably, so that even badly contaminated suits do not pose any danger whatsoever to the wearer. The great advantage of this system is that the activated carbon is accessible on the inside as well as the outside, so that poisons which have succeeded in penetrating at damaged or otherwise nontight locations are very rapidly adsorbed. Under extreme conditions, for example when a drop of a thickened poison lands from a considerable height on a somewhat open location on the outer material and is able to strike through to the carbon, however, the carbon layer may be locally not up to its task for a brief period.

The adsorbing layer in the air pervious, permeable protective suits described above is in most cases engineered such that either activated carbon particles up to about 1.0 mm in size on average are bonded to small heaps of adhesive printed onto a support, or else a reticulated PU foam impregnated with a “carbon paste” (i.e., binder plus activated carbon) is used as an adsorbing layer, in which case the adsorbing layer is generally complemented by an outer, i.e., covering material, and the wearer-facing inside surface is covered with a lightweight textile material. Occasionally, however, composite materials will be utilized which comprise a sheetlike activated carbon structure, for example an activated carbon batt.

There are also protective suits deployed which are equipped with a membrane which, although water vapor pervious for enhanced wear comfort, also act as a barrier layer to liquids, especially toxic agents. Such a material is described for example in EP 0 827 451 A2.

Protective suits having a membrane which is pervious to water vapor but impervious to poisons, especially contact poisons, have the disadvantage that poisons which have succeeded in penetrating at nontight locations remain in the interior of the protective suit and are absorbed through the skin of the wearer.

The present invention then has for its object to provide an adsorbing or protective material which avoids at least some of the disadvantages described above and which is especially useful for the production of NBC protective materials, such as protective suits, protective gloves, protective shoes, protective covers and the like.

The present invention further has for its object to provide an adsorbing material, especially for use in protective materials, such as protective suits, protective gloves, protective shoes, protective covers and the like, which—as well as a water vapor pervious membrane which at least strongly retards or prevents the passage especially of chemical warfare and toxic agents (contact poisons, for example)—comprises an adsorbing layer based on activated carbon. A certain degree of weight saving on the part of the adsorbing material is desired too.

The present invention further has for its object to provide an adsorbing material, especially for use in protective materials, such as protective suits, protective gloves, protective shoes, protective covers and the like, which ensures a high wear comfort.

By way of achievement of the object described above, the present invention proposes an adsorbing material according to claim 1. Further, advantageous elaborations of the adsorbing material of the present invention are the subject of respective subclaims and independent claims.

The present invention further provides for the use of the present invention’s adsorbing material for producing protective materials, especially protective suits, protective gloves, protective shoes, protective covers (to transport casualties, for example), and the like, especially for NBC deployment.

The present invention further has for its object to provide protective materials, especially protective suits, protective gloves, protective shoes, protective covers (to transport casualties, for example), protective suits and the like, especially for NBC deployment, which have been produced using the adsorbing material of the present invention.

Further advantages, properties, aspects and features of the present invention will become apparent from the following description of a preferred operative example depicted in the drawing.

BRIEF SUMMARY OF THE INVENTION

The invention relates to an adsorbing material (1) with a protective function against chemical toxins, especially chemical warfare agents, the adsorbing material (1) comprising a multilayered layer construction (2), the layer construction (2) comprising at least one in particular sheetlike carrier layer (3) and, associated to the carrier layer (3), a barrier layer (4) which prevents or at least retards the passage of chemical poisons, the barrier layer (4) comprising on the one hand at least one adsorbing layer (5) based on an adsorbent for chemical poisons and especially on activated carbon, and, on the other hand, at least one at least essentially water and air impervious but water vapor pervious membrane (6) which retards the passage of chemical poisons or is at least essentially impervious to chemical poisons. The adsorbing material (1) has a high wear comfort, in particular good breathability, while at the same time having excellent protection against chemical poisons.

One object of the present invention is to provide an improved material having a protective function.

Related objects and advantages of the present invention will be apparent from the following description.

BRIEF DESCRIPTION OF THE SEVERAL VIEWS OF THE DRAWINGS

FIG. 1 is a schematic section through the layer construction of a breathable adsorbing material as per a preferred operative example of the present invention according to a specific embodiment.

DETAILED DESCRIPTION OF THE INVENTION

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The sole FIGURE depicts a schematic section through the layer construction 2 of an inventive adsorbing material 1 according to a specific elaboration. The present invention's adsorbing material 1, which is breathable as defined in the present invention and which is endowed with a protective function against chemical poisons, especially chemical warfare agents, comprises a multilayered layer construction 2, the multilayered layer construction 2 comprising at least one in particular sheetlike (i.e. flat or flat-shaped) carrier or support layer 3 and, associated to the carrier layer 3, a barrier layer 4 which prevents or at least retards the passage of chemical poisons, the barrier layer 4 comprising on the one hand at least one adsorbing layer 5 based on an adsorbent for chemical poisons and especially on activated carbon, and, on the other, at least one at least essentially water and air impervious but water vapor pervious membrane 6 which retards the passage of chemical poisons or is at least essentially impervious to chemical poisons.

The fundamental idea of the present invention consists in equipping a breathable adsorbing material 1 having a multilayered layer construction 2 with an increased or improved protective function against chemical poisons, especially chemical warfare agents, by endowing the barrier layer 4 not only with at least one adsorbing layer 5 but also with at least one at least essentially water and air impervious but water vapor pervious membrane 6 which retards the passage of chemical poisons or is at least essentially impervious to chemical poisons.

The aforementioned membrane 6 which are for example disposed between the carrier layer 3 and the adsorbing layer 5, has the effect that any chemical poisons, such as chemical warfare agents for example, which have penetrated through the carrier layer 3 cannot penetrate further into the material, and that these poisons, for example when the membrane 6 is disposed between the carrier layer 3 and the adsorbing layer 5, do not arrive at the adsorbing layer 5 at all or at least not to an overwhelming proportion, so that the adsorption capacity of the adsorbing layer 5 remains quasi inexhaustible. In addition, the presence of the membrane 6 provides additional protection to the wearer of the adsorbing material 1, so that an adsorbing material 1 results which has as it were double the protective function against chemical poisons, namely first through the barrier effect of the membrane 6 and secondly through the adsorptive effect of the adsorbing layer 5. By endowing the present invention's adsorbing material 1 with a specific breathable. membrane 6 which retards the passage of chemical poisons or is at least essentially impervious to chemical poisons, good decontaminability and regenerability of the present invention's adsorbing material 1 is achieved at the same time. This is because any poisons which have penetrated through the outer or carrier layer 3 and are situated on the membrane 6 can readily be removed again from the membrane 6 by appropriate methods of treatment, for example by flushing off, for example with suitable decontaminating solutions which are very well known for these purposes to one skilled in the art.

According to the present invention, the barrier layer 4 of the present invention's absorbing material 1 thus comprises not only an adsorbing layer 5 but also a membrane 6 having the aforementioned properties. The combination of adsorbing layer 5 on the one hand and membrane 6 on the other in accordance with the present invention's layer construction 2 ensures efficient protection against chemical poisons, especially chemical warfare agents, coupled with high wear comfort, especially breathability.

In the use state of the present invention's adsorbing material 1, the carrier layer 3 is advantageously disposed on the outside, especially facing a noxiant source releasing chemical poisons. Consequently, the barrier layer 4 is in relation to the carrier layer 3 advantageously disposed on the inside, especially facing away from a noxiant source releasing chemical poisons.

Furthermore, the adsorbing material 1 further comprises at least one in particular sheetlike covering layer 7 associated to the adsorbing layer 5. The covering layer 7 may serve in particular to cover the barrier layer 4, especially the adsorbing layer 5. The covering layer 7 may in particular contribute to preventing an excessive mechanical loading of the barrier layer 4, in particular of the adsorbing layer 5. The covering layer 7 may also simultaneously serve as carrier for the adsorbent of the adsorbing layer 5 and/or for the membrane 6. In particular the covering layer 7 may be part of the barrier layer 4.

Furthermore, the adsorbing material 1 comprises at least one further, in particular sheetlike additional covering layer 8, wherein, in the use state of the adsorbing material 1, the additional covering layer 8 is preferably disposed on the inside, in particular facing away from a noxiant source releasing chemical poisons and thus the carrier layer 3 is disposed opposite. The additional covering layer 8 and the carrier layer 3 may in particular form the two outer layers 3, 8 of the adsorbing material 1 wherein, in the use state of the adsorbing material 1, the additional covering layer 8 advantageously forms a liner.

The individual layers 3, 4, 5, 6, 7, 8 of the layer construction 2 may each be interconnected; this is accomplished using methods known per se for these purposes, (for example by adhering, welding, sewing, tacking, etc.). Advantageously, the interconnecting or fixing of the individual layers 3, 4, 5, 6, 7, 8 of the layer construction 2 is in each case effected seamlessly, preferably without damaging the individual layers 3, 4, 5, 6, 7, 8 (for example by adhering, welding, etc.). In the event that the layers 3, 4, 5, 6, 7, 8 are at least partly sewn together or the like, it is advisable to seal off the seam locations, for example with a so-called seam-sealing tape. In particular, the individual layers 3, 4, 5, 6, 7, 8 of the layer construction 2 form a coherent conjugate.

Alternatively, however, the individual layers 3, 4, 5, 6, 7, 8 of the layer construction 2 may also at least partly be present unbonded, for example placed loosely on top of each other.

The individual layers 3, 4, 5, 6, 7, 8 of the layer construction 2 can be disposed as follows in the adsorbing material 1, in which case the individual layers 3, 4, 5, 6, 7, 8 can be bonded to each other, which is indicated by the symbol "+", or else can be placed on top of each other unbonded, which is indicated by the symbol "/":

(3)+(6)+(7)+(5)+(8)
(3)+(6)/(7)+(5)+(8)
(3)/(6)+(5)+(8)
(3)/(6)+(7)+(5)+(8)
(3)+(6)+(5)+(7)/(8)
(3)+(6)/(5)+(8)
(3)+(6)+(5)+(8)
(3)/(6)+(5)+(7)/(8)
(3)/(6)+(5)/(8)
(3)+(6)/(7)+(5)/(8)
(3)+(6)/(7)+(5)+(7)/(8)

In the use state of the adsorbing material 1, the carrier layer 3 is generally disposed on the outside, especially facing a noxiant source releasing chemical poisons and the additional covering layer 8 is disposed on the inside, especially facing away from a noxiant source releasing chemical poisons.

With regard to the covering layer 7 and/or the additional covering layer 8, the covering layer 7 and/or the additional covering layer 8 serves/serve to stabilize and/or to protect the adsorbing layer 5 and/or the membrane 6. The covering layer 7 and/or the additional covering layer 8 may be constructed as a preferably air permeable textile material, especially a textile fabric, such as a woven, loop-formingly knitted, loop-drawingly knitted, nonwoven-scrim or bonded-fiber fabric. The covering layer 7 and/or the additional covering layer 8 preferably has/have a lower basis weight than the carrier layer 3. In particular the covering layer 7 has a basis weight in the range from 5 to 75 g/m$^2$, especially in the range from 10 to 50 g/m$^2$, preferably in the range from 15 to 30 g/m$^2$, more preferably less than 60 g/m$^2$, especially less than 50 g/m$^2$, preferably less than 40 g/m$^2$. The additional carrier layer 8 has a basis weight in the range from 5 to 150 g/m$^2$, especially in the range from 20 to 125 g/m$^2$, preferably in the range from 30 to 100 g/m$^2$ and more preferably in the range from 40 to 90 g/m$^2$. According to the configuration of the present invention's adsorbing material 1 the membrane 6 may be laminated onto the covering layer 7 and/or onto the additional covering layer 8, for example by means of a preferably discontinuously, especially dottedly, applied adhesive and/or by means of a hotmelt adhesive web. Advantageously the covering layer 7 and/or additional covering layer 8 is/are abrasion resistant and in particular consists/consist of an abrasion resistant textile material.

With regard to the material of the carrier layer 3, which in the use or wear state generally forms the outer layer of the adsorbing material 1, any desired, in particular breathable materials can be used here. Examples thereof are textile materials of any kind, preferably air pervious textile materials, especially in the form of textile fabrics, examples being woven fabrics, formed-loop knits, drawn-loop knits, nonwoven scrims or bonded fabrics. For example, the bonded fabric can be a batt. To prevent or resist any penetration of chemical poisons, for example of concentrated droplets of warfare agents, oleophobicization and/or hydrophobicization of the material of the carrier layer 3, in particular by a specific impregnation, is advisable.

The basis weight of the material of the carrier layer 3 is generally in the range from 50 to 300 g/m$^2$, especially in the range from 75 to 250 g/m$^2$ and preferably in the range from 90 to 175 g/m$^2$. In particular the carrier layer 3 is constructed as an air pervious textile fabric which has a basis weight in the range from 75 to 250 g/m$^2$ and preferably in the range from 90 to 175 g/m$^2$ and may have been finished to be oleophobic and/or hydrophobic.

Membrane 6 is generally a continuous, in particular uninterrupted or at most microporous membrane. The thickness of the membrane 6 is generally in the range from 1 to 500 μm, especially in the range from 1 to 250 μm, preferably in the range from 1 to 100 μm, more preferably in the range from 1 to 50 μm, even more preferably in the range from 2.5 to 30 μm and most preferably in the range from 5 to 25 μm. To enhance the wear comfort and especially the breathability, membrane 6 has a 25° C. water vapor transmission rate of not less than 12.5 l/m$^2$ per 24 h, especially not less than 17.5 l/m$^2$ per 24 h, preferably not less than 20 l/m$^2$ per 24 h or more when 50 μm thick (measured by the inverted cup method of ASTM E 96 and at 25° C.) (for further details concerning the measurement of the water vapor transmission rate [WVTR] cf. also McCullough et al. "A comparison of standard methods for measuring water vapour permeability of fabrics" in *Meas. Sci. Technol. [Measurements Science and Technology]* 14, 1402-1408, August 2003). This ensures a particularly high wear comfort.

Owing to the multiplicity of layers 2, 3, 4, 5, 6, 7 and 8 of the layer construction 2, the water vapor transmission rate of the adsorbing material 1 is overall (compared with membrane 6 alone) somewhat reduced, but the water vapor transmission rate of the adsorbing material 1 overall is nonetheless very high and amounts to not less than 10 l/m$^2$ per 24 h, especially not less than 15 l/m$^2$ per 24 h and preferably not less than 20 l/m$^2$ per 24 h when the membrane 6 is 50 μm thick (at 25° C.).

Membrane 6 should for reasons of breathability have a low water vapor transmission resistance $R_{et}$ under steady state conditions—measured according to DIN EN 31 092:1993 of February 1994 ("Textiles—Physiological Effects, Measurement of Heat and Water Vapor Transmission Resistance Under Steady State Conditions [sweating guarded-hotplate test]") or according to the equivalent international standard ISO 11 092—at 35° C. of not more than 30 (m$^2$·Pascal)/watt, in particular not more than 25 (m$^2$·Pascal)/watt, preferably not more than 20 (m$^2$·Pascal)/watt when the membrane 6 is 50 μm thick.

Owing to the multiplicity of layers 2, 3, 4, 5, 6, 7 and 8 of the layer construction 2, the water vapor transmission resistance $R_{et}$ of the adsorbing material 1 overall is (compared with membrane 6 alone) somewhat higher; in general, the water vapor transmission resistance $R_{et}$ of the adsorbing material 1 is overall not more than 30 (m$^2$·Pascal)/watt, especially not more than 25 (m$^2$·Pascal)/watt, and preferably not more than 20 (m$^2$·Pascal)/watt when the membrane 6 is 50 μm thick.

The membrane 6 is at most only minimally swellable and/or capable of imbibing water; a low water-imbibing capacity or swellability increases wear comfort. In particular the swellability and/or the water-imbibing capacity of the membrane 6 should be not more than 35%, especially not more than 25% and preferably not more than 20%, based on the self-weight of the membrane 6. In addition the membrane 6 should be at least essentially impervious to liquids, especially water, and/or to aerosols, or at least retard their passage. To achieve a swellability which is minimal at most, the membrane 6 should comprise no or essentially no strongly hydrophilic groups, especially no hydroxyl groups. For the purposes of minimal swelling, however, the membrane 6 may comprise weakly hydrophilic groups, for example polyether groups.

The membrane 6 may consist of or comprise a plastics material or a polymeric material. Such a plastics material or polymer may suitably be selected for example from the group of polyurethanes, polyetheramides, polyesteramides, polytetrafluoroethylenes and/or cellulose-based polymers and also derivatives of the aforementioned compounds. For example, the membrane 6 may be obtained as a product of the reaction of an isocyanate, especially of a masked or blocked isocyanate, with an isocyanate-reactive crosslinker. For instance, the membrane 6 can be a polyurethane-based membrane. Similarly, the membrane 6 may be an expanded, possibly microporous membrane based on polytetrafluoroethylene.

In a particular embodiment, any membrane 6 present may be constructed as a multilayered membrane laminate or a multilayered membrane conjugate. This membrane laminate or conjugate may consist of at least two and preferably at least three interconjugated membrane layers or plies. For example, this membrane laminate or conjugate may comprise a core layer based on a cellulose-based polymer and two outer layers conjugated with the core layer, in particular on the basis of a polyurethane, of a polyetheramide and/or of a polyesteramide. The core layer can be constructed on the basis of a cellulose-based polymer, as a membrane from 1 to 100 μm, especially 5 to 50 μm and preferably from 10 to 20 μm in thickness, and the two outer layers conjugated with the core layer can each be constructed as a membrane from 1 to 100 μm, especially from 5 to 50 μm and preferably from 5 to 10 μm in thickness. This particular elaboration of membrane 6 makes it possible to combine various membrane materials each having different properties, in particular different water vapor transmission rates and/or permeation resistances to chemical poisons, and so achieve an optimization for the properties of membrane 6. For example, cellulose and cellulose derivatives are excellent barrier layer materials, especially with regard to chemical noxiant and poison materials, for example warfare agents (Hd etc.), and are not attacked or dissolved by these poisons; on the other hand, polyurethane-based materials prevent any migration or diffusion of any plasticizers present in the cellulose layer, and also muffle the cellulose-based rustling occurring during wearing. This is why it is preferred in this particular embodiment that, in the case of a membrane laminate or conjugate, the core layer be formed on the basis of a cellulose-based polymer, while the two outer layers of the membrane 6 be formed by polyurethane layers.

Especially to enhance the stability or wear resistance and especially the tensile strength of membrane 6 in the manufacturing operation (for example in the course of membrane 6 being printed with hot adhesive) and also in use or during wearing, membrane 6 may be laminated onto an additional carrier layer not depicted in the FIGURE.

To enhance the wear comfort on the one hand and to achieve good wear resistance on the other, it is advantageous for the membrane 6 to possess a certain degree of elasticity. More particularly, it is advantageous for the membrane 6 to be extendable or stretchable (relative to the membrane 6) in one or more directions by not less than 10%, especially not less than 20%, preferably not less than 30% or more. Similarly, the layer construction 2 overall should also possess a certain degree of elasticity for the aforementioned purposes as well as being readily bendable; however, compared with membrane 6, the elasticity of the layer construction 2 is as a whole somewhat lower, and in general the layer construction 2 is extendable or stretchable in one or more directions by not less than 5%, preferably not less than 10% and most preferably not less than 15%.

In a particular embodiment not depicted in the figure, the membrane 6 may also constitute the adhesive layer 7 to secure the adsorbing layer 5. In this case, the membrane 6 has to be self-adhesive and in particular thermotacky. This particular embodiment saves weight, since no additional layer of adhesive is needed.

The use of so-called breathable membrane 6, i.e., in particular water vapor pervious but liquid impervious membranes 6, in particular in the form of thin films, provides surprising improvements for NBC protective apparel, in particular when the adsorptive filtering layer 5 is disposed behind the membrane 6, i.e., downstream of membrane 6 in the use or wear state. Such membranes 6 may be based for example on various designs, two of which may be mentioned nonlimitingly in what follows:

1. monolithic, (weakly) hydrophilic membranes, especially composed of polyurethane-coated PTFE, polyurethanes, modified or unmodified polyesters or modified or unmodified polyamides;
2. microporous, hydrophobic membranes, especially of microporous PTFE, polyurethanes or polyolefins (these membranes generally being liquid-tight only to a limited degree, but air pervious).

The use of membranes of Group 1 makes it possible to reduce the permeation rates through the adsorptive activated carbon filtering layers 5, to zero in certain circumstances. The adsorptive filtering layers 5 can therefore be reduced by up to 90% in thickness and mass depending on the diffusion rate of noxiants through membrane 6. In addition, the protective suits obtained are particle-tight, so that they can also be used to provide protection against B weapons and radioactive particles.

The use of membranes of Group 2 does not make it possible to reduce the weight of the adsorptive filtering layers 5 on account of the air flow. However, in this case, the membranes 6 serve as effective particle filters for aerosols, B weapons and radioactive particles.

Layer 5 of the present invention's adsorbing material 1 is generally discontinuous, i.e., the adsorbing layer 5 comprises in general discrete adsorbing particles (for example adsorbents based on activated carbon) which are capable of adsorbing chemical poisons and which may for example be fixed by means of an adhesive to the membrane 6 or else to the covering layers 7, 8 or else to an additional carrier etc. The adsorbing material of the adsorbing layer 5 can be in particular an adsorbing material which contains or consists of activated carbon, an example being a material based on activated carbon in the form of activated carbon particles and/or activated carbon fibers.

This is because when materials comprising activated carbon are used to form the adsorbing layer 5, the already high wear comfort can be further enhanced since the activated carbon can serve as an intermediate moisture or water store (for perspiration, for example) and can buffer moisture or water. When for example activated carbon spherules are used as an adsorbing material for the adsorbing layer 5, add-ons of up to about 250 g/m$^2$ or more are customary, so that for example in the event of sweating about 40 g/m$^2$ of moisture can be stored and, in the case of a breathable carrier or outer layer 3, can then be given off again to the environment.

Advantageously, the adsorbing layer 5 may be constructed as an adsorption sheet filter, especially on the basis of an adsorbent fixed to a preferably sheetlike and in particular textile carrier.

In an embodiment of the present invention, the adsorbing layer 5 comprises discrete particles of activated carbon, preferably in granule form ("granulocarbon") or spherical form ("spherocarbon"), in particular wherein the average diameter of the activated carbon particles is less than 1.0 mm, especially less than 0.5 mm, preferably less than 0.4 mm, more preferably less than 0.35 mm; the average diameter of the activated carbon particles is however not less than 0.1 mm. In this embodiment the activated carbon particles are used in an amount in the range from 5 to 500 g/m$^2$, preferably in the range from 20 to 300 g/m$^2$, more preferably in the range from 25 to 250 g/m$^2$ and most preferably in the range from 50 to 100 g/m$^2$. Suitable activated carbon particles have an internal surface area (BET) of not less than 800 m$^2$/g, especially of not less than 900 m$^2$/g, preferably of not less than 1000 m$^2$/g and more preferably in the range from 800 to 1500 m$^2$/g. Granulocarbon, especially spherocarbon, has the decisive advantage of being enormously abrasion-resistant and very hard, which is of great importance with regard to the wear properties. Preferably, the bursting pressure for an individual activated carbon particles, especially activated carbon granule or spherule, is generally not less than about 5 newtons, especially not less than about 10 newtons, and can be up to about 20 newtons.

In an alternative embodiment, the adsorbing layer 5 may comprise activated carbon fibers, especially in the form of activated carbon fabrics, as an adsorbent. The basis weight of such activated carbon fiber fabrics may be for example in the range from 20 to 200 g/m$^2$, especially in the range from 30 to 150 g/m$^2$ and preferably in the range from 15 to 120 g/m$^2$. These activated carbon fiber fabrics may be for example a woven, loop-formingly knitted, nonwoven-scrim or bonded-fiber activated carbon fiber fabric (based for example on carbonized and activated cellulose and/or carbonized and activated acrylonitriles).

It is similarly possible to combine activated carbon particles and activated carbon fibers with each other to form the adsorbent for the adsorbing layer 5. Activated carbon particles have the advantage of a higher adsorption capacity, whereas activated carbon fibers possess better adsorption kinetics.

To increase the adsorption efficiency and/or performance, it is possible for the adsorbent of the adsorbing layer 5, especially the activated carbon particles and/or the activated carbon fibers, additionally to be impregnated with at least one catalyst. Catalysts useful for the purposes of the present invention include for example enzymes and/or metal ions, preferably copper, silver, cadmium, platinum, palladium, zinc and/or mercury ions. The amount of catalyst can range within wide limits; it is generally in the range from 0.05% to 12% by weight, preferably in the range from 1% to 10% by weight and more preferably in the range from 2% to 8% by weight, based on the weight of the adsorbing layer 5.

To achieve an efficient adsorption performance, it is preferable for not less than 50%, especially not less than 60% and preferably not less than 70% of the adsorbing layer 5 or of the adsorbents of the adsorbing layer 5 to be freely accessible for the poisons and warfare agents to be adsorbed, in particular by not being covered with adhesive. This is accomplished by determining the amount and the type, especially the viscosity, of the adhesive whereby the adsorbents are fixed if appropriate such that the adsorbents of the adsorbing layer 5 are not fully pressed into the adhesive or do not fully sink into the adhesive.

The present invention's adsorbing material 1 offers an efficient protection against chemical poisons, especially chemical warfare agents, while providing high wear comfort, especially good breathability, in the case of NBC protective suits. Owing to these properties, the present invention's adsorbing material 1 is according to the present invention particularly useful for military deployment and/or NBC deployment (in the form of an NBC protective suit, for example).

As a consequence of the high efficiency of the protective function of the adsorbing layer 5, which is enhanced by the present invention's use of the membrane 6, it is possible to use breathable carrier or outer materials 3, textiles for example, so that wear comfort can be increased in this way without the wearer of such a protective suit being exposed to any increased danger due to the use of a breathable carrier or outer material 3.

Owing to the high flexibility and good bendability of the individual layers 3, 4, 5, 6, 7 and 8 and of the layer construction 2 as a whole, it is not just good wear comfort which is achieved, but also good wear resistance on the part of the present invention's adsorbing material 1.

The present invention's elaboration of the adsorbing material 1 according to the present invention provides an excellent permeation resistance with regard to chemical warfare agents. The permeation resistance of the adsorbing material 1 or of the membrane 6 to chemical warfare agents, especially bis[2-chloroethyl] sulfide (also known by the synonyms of mustard gas, Hd or Yellow Cross), measured according to CRDEC-SP-84010, method 2.2, allows the passage of not more than 4 μg/cm$^2$ per 24 h, especially not more than 3.5 μg/cm$^2$ per 24 h, preferably not more than 3.0 μg/cm$^2$ per 24 h and more preferably not more than 2.5 μg/cm$^2$ per 24 h when the membrane 6 is 50 μm thick.

The adsorbing material of the present invention can be produced in a conventional manner. This will be very well known to one skilled in the manufacturing arts of adsorbing materials, so that no further details are required here.

As stated above, the adsorbing material of the present invention is useful for producing protective materials of any kind, especially protective suits, protective gloves, protective shoes and protective covers. The present invention accordingly also provides such protective materials produced by using the adsorbing material of the present invention.

As mentioned above, in the protective materials of the present invention, the carrier layer is in the use state of the adsorbing material generally disposed on the outside, especially facing a noxiant source releasing chemical poisons. Preferably, the protective materials are protective suits and especially NBC protective suits wherein, in the use state, the carrier layer is disposed on the outside, especially facing a noxiant source releasing chemical poisons and on the body-remote side.

CONCRETE OPERATIVE EXAMPLES WILL NOW BE DESCRIBED

1. Design of Complete Protective Suit

Details of Embodiment

The following layers may be present in an NBC protective suit comprising membranes:

A: outer fabric

B: membrane

C: cover (if required by the adsorptive layer chosen)

D: adsorptive layer

E: liner

These layers can be bonded to one another by lamination ("+") or lie on top of one another in an unbonded, loose state ("/"). The following design possibilities are for example sensible and technically realizable:

1. A+B+C+D+E
2. A+B/C+D+E
3. A/B+D+E
4. A/B+C+D+E
5. A+B+D+C/E
6. A+B/D+E
7. A+B+D+E
8. A/B+D+C/E
9. A/B+D/E
10. A+B/C+D/E
11. A+B/C+D+C/E

The seams of the membrane laminate can be sealed off liquid-tight by hotmelt adhesive tapes in the case of designs 2, 3, 4, 6, 7, 9, 10, 11. But this is not necessary to achieve the required NBC protective effect when the adsorptive filtering material is used.

Zip fasteners are for example constructed with external or internal double covers (for example, one each on the right hand side and on the left hand side of the zip fastener), consisting of membrane laminate and filter comprising a large amount of activated carbon.

In a specific embodiment in which the seams of the membrane laminate are not sealed watertight, the seams in the membrane laminate and in the adsorptive liner are engineered for example such that they do not come to lie one directly above the other. This further enhances the consistency of the protective effect.

2. Combination of Membrane Protective Suit with Adsorptive Undergarment

In a further possible design, the membrane functional layer and the adsorptive functional layer are separated from each other in various plies of the clothing. The adsorptive layer is worn as an undergarment in the manner of an undersuit or in the manner of underwear.

The membrane may be installed into an outer protective jacket, in which case there are the following possible designs (featuring the same symbols as above)

1. A+B+E
2. A+B/E
3. A/B+E
4. A/B+C/E

The stitches piercing the membrane are sealed liquid-tight by means of a seam-sealing tape.

3. Removable Adsorptive Functional Layer

The adsorptive functional layer can be made removable, for example when the protective clothing is to be used for other purposes, or a low potential hazard can be assumed. The membrane design in this case corresponds to the possible designs under item 2. The adsorptive layer has for example the construction of C+D+E (with the same symbols as above) and can be attached to the membrane layer by means of, for example, zip fasteners, touch and close fasteners, press studs and the like.

It is generally sufficient for NBC protective suits to use conventional fastener systems. In an enhanced-protection embodiment, for example, an approximately 10 cm wide strip of the adsorptive filtering material can be used on all or some of these openings in a mass corresponding to systems which do not utilize membranes. This further reduces or prevents any ingress of warfare agents through openings.

Further elaborations, modifications and variations of the present invention will become apparent to and realizable by the ordinarily skilled after reading the description without their having to go outside the realm of the present invention.

The invention claimed is:

1. A protective suit comprising a breathable adsorbing material having a protective function against chemical warfare agents, the adsorbing material comprising a multilayered layer construction including at least one sheetlike carrier layer and a barrier layer which is constructed and arranged to retard the passage of said agents, the barrier layer comprising:

at least one adsorbing layer based on an adsorbent for said agents, the adsorbent being based on activated carbon, wherein the adsorbing layer includes at least one covering layer;

at least one essentially water-impervious and air-impervious membrane that is constructed and arranged to be water-vapor-pervious for retarding the passage of said agents, said membrane being constructed and arranged as a multilayered membrane laminate formed from at least two interconjugated layers; and wherein the membrane is disposed between the carrier layer and the covering layer, the covering layer being constructed and arranged as a carrier for and disposed between the adsorbent and the membrane, and wherein the adsorbing layer comprising the adsorbent is fixed by means of an adhesive to the covering layer such that at least 50% of the adsorbent is freely accessible for said agents to be adsorbed by not being covered with the adhesive.

2. The protective suit according to claim 1, wherein, in the use state of the adsorbing material, the carrier layer is disposed on the outside and faces a noxiant source releasing said agents and the barrier layer is disposed on the inside and faces away from a noxiant source releasing chemical poisons.

3. The protective suit according to claim 1, wherein the adsorbing material further comprises at least one further sheetlike additional covering layer, wherein, in the use state of the adsorbing material, the additional covering layer is disposed on the inside facing away from a noxiant source releasing said agents and the carrier layer is disposed opposite and wherein the additional covering layer and the carrier layer form the two outer layers of the adsorbing material.

4. The protective suit according to claim 1, wherein the individual layers of the multilayered layer construction are each bonded to each other and form a conjugate.

5. The protective suit according to claim 1, wherein the individual layers of the multilayered layer construction are, at least in part, placed on top of each other unbonded.

6. The protective suit according to claim 1, wherein the carrier layer is oleophobicized and/or hydrophobicized by a specific impregnation.

7. The protective suit according to claim 1, wherein the membrane is a continuous or at most microporous membrane and wherein the thickness of the membrane is in the range from 1 to 500 μm.

8. The protective suit according to claim 1, wherein the membrane has a 25° C. water vapor transmission rate of not less than 12.5 l/m$^2$ per 24 h when 50 μm thick, and wherein the adsorbing material has a 25° C. water vapor transmission rate of not less than 10 l/m$^2$ per 24 h when the membrane is 50 μm thick.

9. The protective suit according to claim 1, wherein the membrane has a steady state water vapor transmission resistance $R_{et}$, measured according to DIN EN 31 092: 1993 dated February 1994 and ISO 11 092, at 35° C. of not more than 5 (m$^2$·pascal)/watt when 50 μm thick, and wherein the adsorbing material has a steady state water vapor transmission resistance $R_{et}$, measured according to DIN EN 31 092: 1993 dated February 1994 and ISO 11 092, at 35° C. of not more than 30 (m$^2$·pascal)/watt when membrane is 50 μm thick.

10. The protective suit according to claim 1, wherein the membrane laminate consists of at least three interconjugated layers.

11. The protective suit according to claim 10 wherein the membrane laminate comprises a core layer based on a cellulose-based polymer and two outer layers conjugated with the core layer and on the basis of a polyurethane, of a polyetheramide and/or of a polyesteramide, wherein the core layer has a thickness from 1 to 100 μm and wherein the two outer layers conjugated with the core layer have a thickness from 1 to 100 μm each.

12. The protective suit according to claim 1, wherein the adsorbing layer is discontinuous and comprises discrete adsorbing particles based on activated carbon, which adsorb said agents.

13. The protective suit according to claim 1, wherein the adsorbing material and the membrane possess a permeation resistance to said agents, measured according to CRDEC-SP-84010, method 2.2, that allows the passage of not more than 4 μg/cm$^2$ per 24 h when the membrane is 50 μm thick.

* * * * *